(12) United States Patent
Shirota

(10) Patent No.: US 8,301,845 B2
(45) Date of Patent: Oct. 30, 2012

(54) ACCESS CONTROL METHOD AND COMPUTER SYSTEM

(75) Inventor: Tomoo Shirota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 583 days.

(21) Appl. No.: 12/461,126

(22) Filed: Jul. 31, 2009

(65) Prior Publication Data

US 2010/0082908 A1    Apr. 1, 2010

(30) Foreign Application Priority Data

Sep. 29, 2008  (JP) ................. 2008-250919

(51) Int. Cl.
*G06F 12/00*    (2006.01)
(52) U.S. Cl. ................. 711/147; 711/152; 711/E12.094
(58) Field of Classification Search .................. 711/152, 711/E12.094
See application file for complete search history.

(56) References Cited

U.S. PATENT DOCUMENTS 6,401,110 B1 *  6/2002  Freitas et al. ................. 718/104
2007/0266196 A1 * 11/2007  Torii ............................. 710/309

FOREIGN PATENT DOCUMENTS

| JP | 61-259362 | 11/1986 |
|----|-----------|---------|
| JP | 03-160552 | 7/1991 |
| JP | 05-002569 | 1/1993 |
| JP | 10-027131 | 1/1998 |

* cited by examiner

*Primary Examiner* — Kevin Verbrugge
(74) *Attorney, Agent, or Firm* — Staas & Halsey LLP

(57) ABSTRACT

An access control method for a computer system in which a plurality of clusters share a storage unit, includes predefining an access instruction with exclusive right in addition to an access instruction that is issued with respect to the storage unit from the plurality of clusters, and monitoring, in the storage unit, based on the access instruction with exclusive right transferred from an arbitrary cluster, an access state of an other cluster and executing access instructions with exclusion if a region accessed by an access instruction from the other cluster overlaps a region accessed by the access instruction with exclusive right.

10 Claims, 8 Drawing Sheets

ACCESS CONTROL METHOD AND COMPUTER SYSTEM

CROSS-REFERENCE TO RELATED APPLICATIONS

This application is based upon and claims the benefit of priority of the prior Japanese Patent Application No. 2008-250919, filed on Sep. 29, 2008, the entire contents of which are incorporated herein by reference.

FIELD

The present invention generally relates to access control methods and computer systems, and more particularly to an access control method which carries out an exclusive control of accesses from a plurality of clusters to a shared storage unit, and to a computer system which employs such an access control method.

BACKGROUND

FIG. 1 is a block diagram for explaining a conventional access control, and FIG. 2 is a diagram for explaining problems of the conventional access control.

In a computer system illustrated in FIG. 1, two clusters 1-0 and 1-1 (CL0 and CL1) share a single System Storage Unit (SSU) 2. Each of the clusters CL0 and CL1 has a processor, such as a Central Processing Unit (CPU).

The cluster CL0 rewrites an access region 21 of the SSU 2 according to the following procedure. First, the cluster CL0 refers to a value of a table 22 which indicates whether the access region 21 is presently rewritable. The table 22 is written with values indicating whether each of the access regions within the SSU 2 are rewritable. If the access region 21 that is to be rewritten by the cluster CL0 is in a rewritable state, the cluster CL0 rewrites the value in the table 22 and acquires a right to store. On the other hand, if the access region 21 that is to be rewritten by the cluster CL0 is in a non-rewritable state, the value in the table is reread a number of times and the cluster CL0 waits until this access region 21 assumes the rewritable state. From the time when the table 22 is read until the time when the table 22 is rewritten, access to the same table 22 by the other cluster CL1 is held as illustrated in FIG. 2. A table rewrite instruction for rewriting the table 22 is called a LOCK instruction, and the data length of the LOCK instruction is 8 bytes or less, for example.

When the cluster CL0 secures the right to store to the access region 21 by reading the table 22, the cluster CL0 rewrites the access region. After the rewriting of the access region 21 by the cluster CL0 ends, the cluster CL0 releases the right to store by rewriting the table 22.

For the sake of convenience, a case will be considered where the other cluster CL1 desires to use the data in the access region 21 after the access region 21 has been rewritten by the cluster CL0, in a state where the cluster CL0 is rewriting the access region 21. In this case, the cluster CL0 rewrites the access region 21 according to the procedure described above. For this reason, in order for the cluster CL1 to confirm the end of updating the access region 21 by the cluster CL0, it is either preferable for the cluster CL1 to (A) read the table 22 and find out that the cluster CL0 is not executing the rewriting and confirm the entry of the updated data by reading the data in the access region 21 or, (B) read only the data in the access region 21 and store to the access region 21 data which enables judgement as to whether the updating by the cluster CL0 has ended completely (that is, it is not during the storing), so that the cluster CL1 can confirm the entry of the updated data by reading only the data in the access region 21.

Of the methods (A) and (B) in which the cluster CL1 confirms whether the updating of the access region 21 by the cluster CL0 has ended, a high-speed processing can be expected by the latter method (B), because the method (B) only requires the instruction to be executed once. However, even in the case of the method (B), if the access region 21 is being updated by the cluster CL0, the cluster CL1 must repeat the access a number of times and wait until the updating of the access region 21 by the cluster CL0 is completed. Moreover, due to improvements in the memory access speed in recent years, the transfer process between the cluster CL0 or CL1 and the SSU 2 affects the improvement of the memory access speed more than the internal process of the SSU 2. Consequently, it contributes more to the improvement of the memory access speed by reducing the number of instructions issued to the SSU 2 from each of the clusters CL0 and CL1.

A method has been proposed in which a specific memory access means secures a predetermined address range, and other memory access means are excluded within the predetermined address range, in order to enable free reading and storing by the specific memory access means. However, it is preferable to issue an instruction again in order to release the predetermined address range which has been secured.

The applicant is aware of Japanese Laid-Open Patent Publications No. 3-160552, No. 61-259362, No. 10-27131 and No. 5-2569.

According to the conventional access control, it is difficult to speed up the procedure in which one cluster confirms the end of updating an access region by another cluster. For this reason, there was a problem in that it is difficult to increase the operation speed of a computer system in which a plurality of clusters share a storage unit.

SUMMARY

Accordingly, it is an object in one aspect of the invention to increase an operation speed of a computer system in which a plurality of clusters share a storage unit.

According to one aspect of the present invention, there is provided an access control method for a computer system in which a plurality of clusters share a storage unit, comprising predefining an access instruction with exclusive right in addition to an access instruction that is issued with respect to the storage unit from the plurality of clusters; and monitoring, in the storage unit, based on the access instruction with exclusive right transferred from an arbitrary cluster, an access state of an other cluster and executing access instructions with exclusion if a region accessed by an access instruction from the other cluster overlaps a region accessed by the access instruction with exclusive right.

According to one aspect of the present invention, there is provided a computer system comprising a plurality of clusters; and a storage unit shared by the plurality of clusters, wherein an access instruction with exclusive right is predefined in addition to an access instruction that is issued with respect to the storage unit from the plurality of clusters, and the storage unit includes a priority determination circuit configured to monitor, based on the access instruction with exclusive right transferred from an arbitrary cluster, an access state of an other cluster and to execute access instructions with exclusion if a region accessed by an access instruction from the other cluster overlaps a region accessed by the access instruction with exclusive right.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

According to one aspect of the present invention, a plurality of clusters share a storage unit. An access instruction with exclusive right is added to access instructions to the shared storage unit, in order to execute a transfer instruction to the shared storage unit and the access instruction with exclusive right with exclusion.

Because it is possible to speed up the procedure in which one cluster confirms the end of updating an access region by another cluster, it is possible to increase the operation speed of the computer system in which a plurality of clusters share the storage unit.

A description will now be given of an access control method and a computer system in each embodiment according to the present invention.

Figure 3:
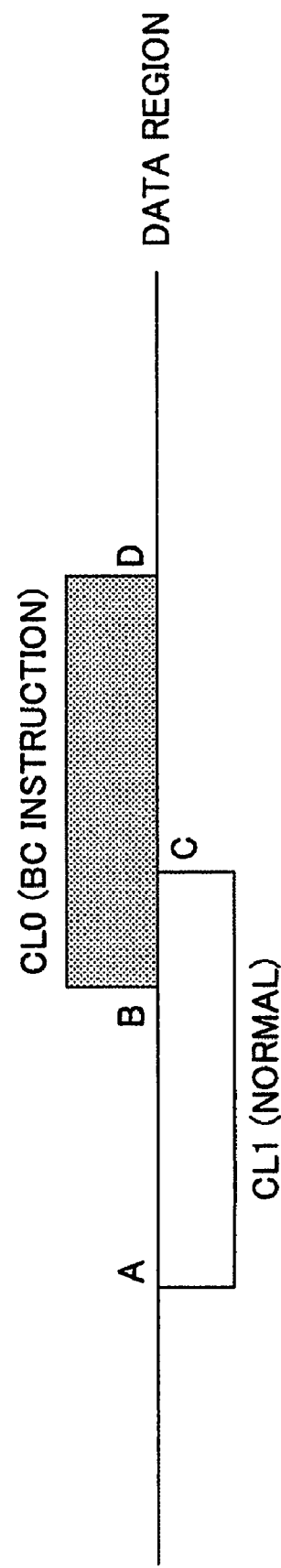
FIG. 3 is a diagram for explaining an access control in an embodiment of the present invention.

FIG. 3 is a diagram for explaining an access control in an embodiment of the present invention. It is assumed for the sake of convenience that the embodiment is applied to a computer system in which a plurality of clusters CL0 and CL1 share a single storage unit. The cluster CL0 rewrites an access region of a data region within the storage unit by the following procedure. In FIG. 3, A, B, C and D denote addresses of the data regions within the storage unit.

In this case, the store instruction with exclusive right is defined in advance (or predefined) and added to the store instruction that is issued from the cluster CL0. This store instruction with exclusive right will also be referred to as a Block Concurrency (BC) instruction. The access state of other clusters is monitored when transferring the data to the storage unit, and the BC instruction is executed with exclusion if an access region of the BC instruction overlaps an access region of an access by other clusters, including store and read or fetch.

In FIG. 3, it is assumed for the sake of convenience that the cluster CL0 issues the BC instruction from the address B to the address D, and the cluster CL1 issues the normal access instruction, such as store or fetch, from the address A to the address C. In a case where the addresses B and C satisfy a relationship B<C, the access region of the cluster CL0 overlaps the access region of the cluster CL1 from the address B to the address C. In other words, in a case where the normal access instruction of the cluster CL1 is being executed first, the BC instruction of the cluster CL0 that is input thereafter specifies an access region which partially overlaps the access region of the normal access instruction which is being executed first. In this case, the execution of the BC instruction of the cluster CL0 is held until all of the data transfer for the addresses A through C of the normal access instruction of the cluster CL1 ends, by a priority determination circuit (PRIO) within the storage unit which does not permit access by the BC instruction. On the other hand, in a case where the BC instruction that is added to the store instruction of the cluster CL0 to the addresses B through D is being executed first and the normal access instruction of the cluster CL1 for the addresses A through C is input thereafter, the normal access instruction of the cluster CL1 is executed after execution of the BC instruction of the cluster CL0 ends first.

By the BC instruction that is added by the cluster CL0 to the store instruction, it is possible to eliminate an inconvenience in which an intermediate result becomes visible when the other cluster CL1 reads a region which overlaps the region accessed by the BC instruction. In addition, the execution of the normal access instruction of the other cluster CL1 is held while the BC instruction is being executed. Because the normal access instruction that is held can be executed immediately after the execution of the BC instruction ends, it is possible to perform the process at a high speed when compared to the case where the other cluster CL1 repeats the access to the storage unit a number of times in order to confirm the end of the access by the cluster CL0.

A read instruction added with exclusive right may be defined in advance (or predefined) and added to the read instruction issued from the cluster CL0. The access state of other clusters is monitored when transferring the data from the storage unit, and the read instruction added with the exclusive right (or BC instruction) is executed with exclusion if an access region of the BC instruction overlaps an access region of an access by other clusters, including store and read.

Figure 1:
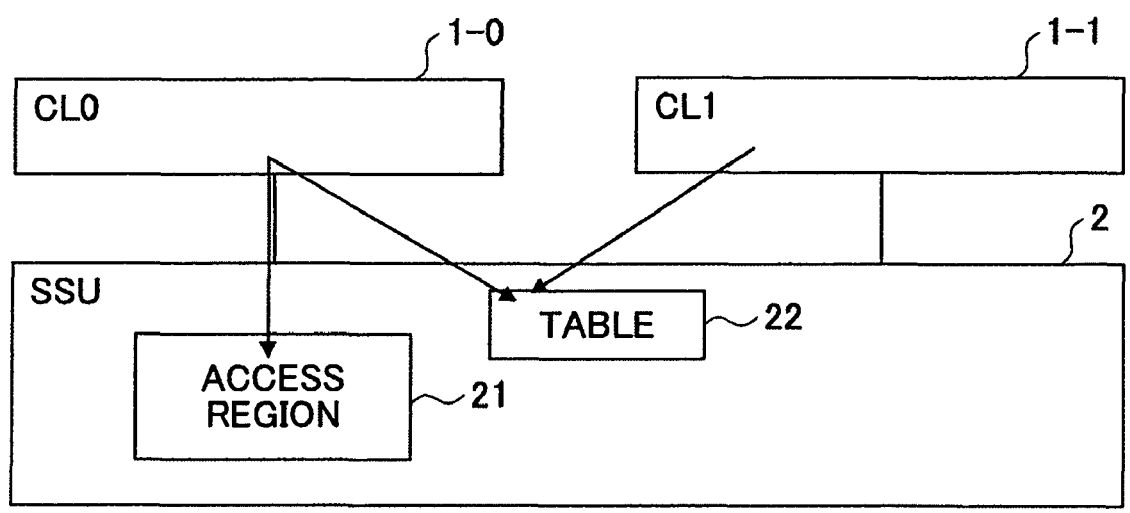
FIG. 1 is a block diagram for explaining a conventional access control.
Figure 2:
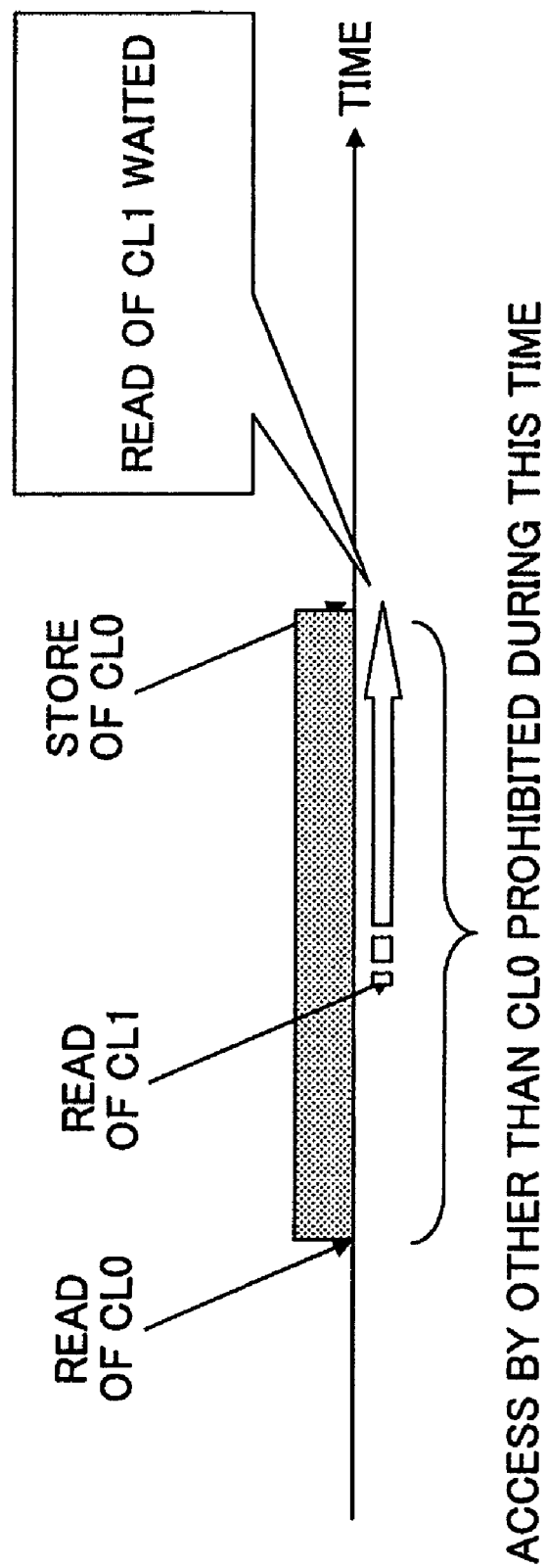
FIG. 2 is a diagram for explaining problems of the conventional access control.
Figure 4:
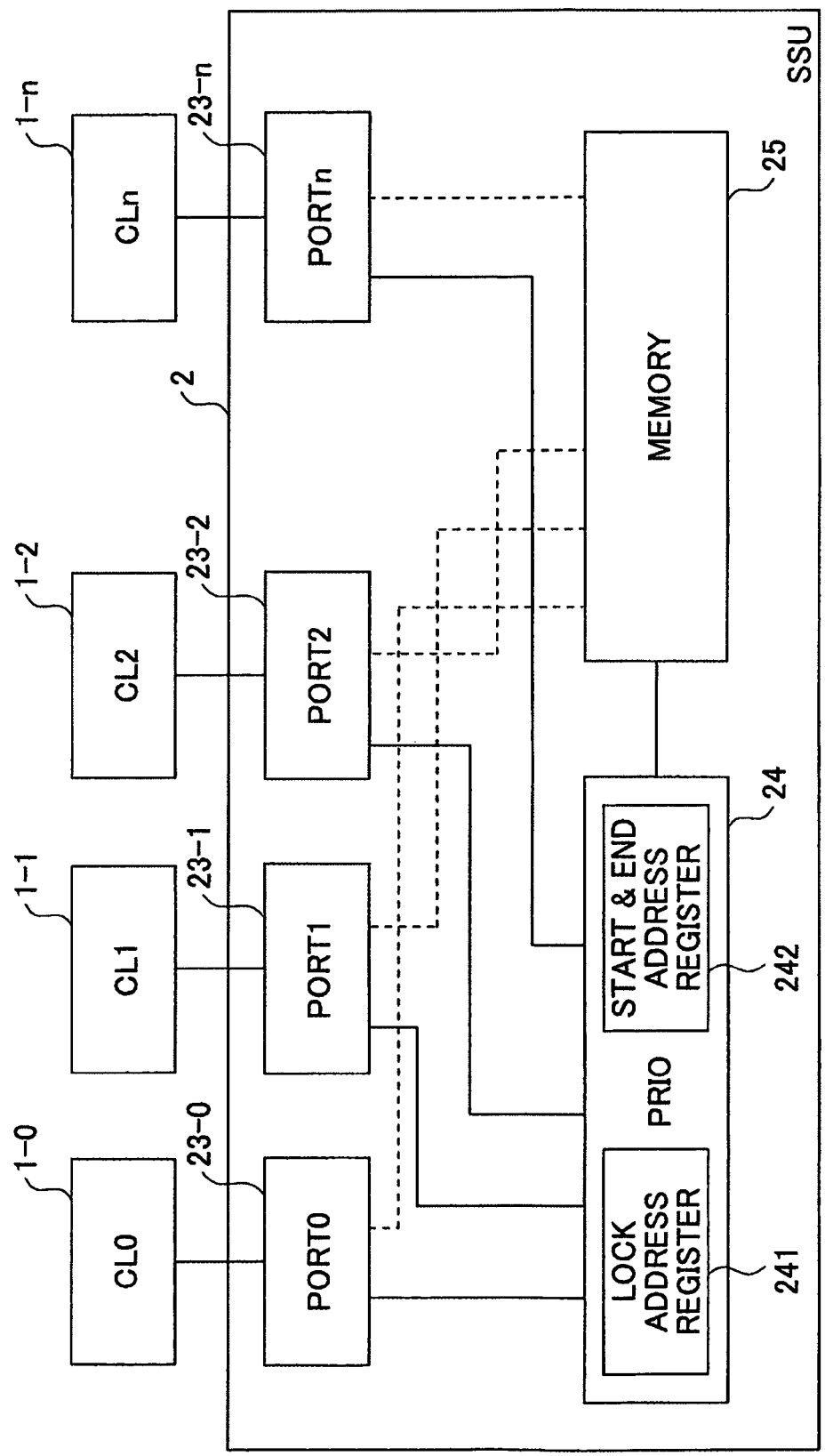
FIG. 4 is a block diagram for explaining a computer system in an embodiment of the present invention.

FIG. 4 is a block diagram for explaining a computer system in an embodiment of the present invention. In FIG. 4, those parts that are the same as those corresponding parts in FIG. 1 are designated by the same reference numerals, and a description thereof will be omitted.

A plurality of ports 23-0 through 23-n (PORT0 through PORTn), a priority determination circuit (PRIO) 24, and a memory 25 are connected as illustrated in FIG. 4 within a SSU 2. Clusters CL0 through CLn and the SSU 2 are connected via the ports PORT0 through PORTn. When each of the clusters CL0 through CLn makes an access to the SSU 2, an instruction, such as a store instruction and a read instruction, an access address, and a transfer length are notified to the corresponding one of the ports PORT0 through PORTn. Each of the ports PORT0 through PORTn notifies the access address and the transfer length, notified from the corresponding one of the clusters CL0 through CLn, to the priority determination circuit 24. As will be described later, a LOCK address register 241 and a start and end address register 242 are provided within the priority determination circuit 24. In FIG. 4, the illustration of the table 22 illustrated in FIG. 1 is omitted.

The access types from each of the clusters CL0 through CLn to the SSU 2 include an instruction (or synchronous instruction) synchronized to the CPU with each of the clusters CL0 through CLn, and an instruction (or asynchronous instruction) which is not synchronized to the CPU within each of the clusters CL0 through CLn and merely starts the CPU and interrupts the CPU when the access ends. The asynchronous instruction is segmented (or divided) into a number of blocks within each of the clusters CL0 through CLn and is executed in blocks. The synchronous instruction is executed by interrupting the asynchronous instruction which is segmented into the blocks, because the priority (or priority order) of the synchronous instruction is higher than that of the asynchronous instruction. For this reason, when viewed from the SSU 2, the instructions executed from the clusters CL0 through CLn are always one from each of the clusters CL0 through CLn.

For example, when the cluster CL0 makes access to the SSU 2, the access type, such as the data store instruction, the data read instruction and the table rewrite instruction (LOCK instruction), the access start address, and the access length are notified from the cluster CL0. The access length of the LOCK instruction is set to a minimum access length in order to reduce the table rewriting time.

Figure 5:
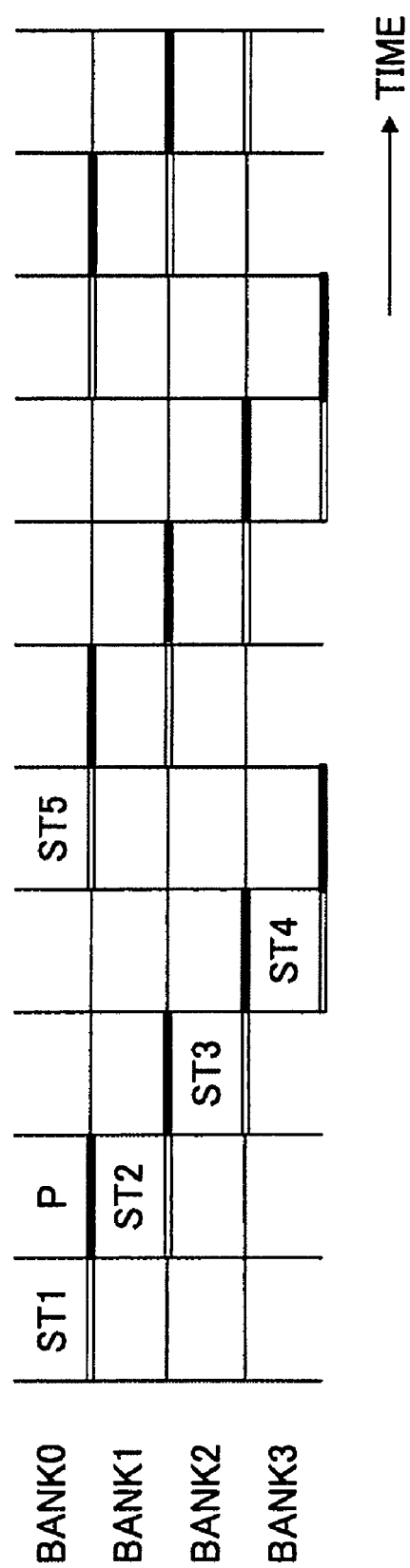
FIG. 5 is a diagram for explaining accesses that are executed in parallel.

FIG. 5 is a diagram for explaining accesses that are executed in parallel. For example, the access from the cluster CL0 is segmented within the SSU 2, and the blocks (or access segments) are executed in an order starting from the smaller address. The SSU 2 is designed to be able to execute a plurality of accesses in parallel if the access addresses are different. FIG. 5 illustrates a case where the number of accesses that may be executed in parallel is 4, that is, there are 4 banks (4BANK). The blocks (or units) into which the access is segmented are set to a length of such an extent that the bank to be accessed changes to the next bank when one access is executed. For the sake of convenience, FIG. 5 indicates the access from the cluster CL0 by a double line, and the access from the cluster CL1 is indicated by a bold line.

In a case where the start address of the cluster CL0 corresponds to the bank BANK0, the access of the first block which is obtained by the segmenting of the access is executed as indicated by ST1 in FIG. 5. Because the next block is determined in advance to correspond to the bank BANK1, the access of the next block is executed as indicated by ST2 in FIG. 5. Similarly thereafter, the accesses of the subsequent blocks are executed as indicated by ST3 and ST4 in FIG. 5 in this order, and the access then returns to the access of the original bank BANK0 as indicated by ST5 in FIG. 5. By setting a time interval between the access of the first block indicated by ST1 in FIG. 5 and the access of the block returning to the bank BANK0 and indicated by ST5 in FIG. 5 to a sufficiently long time, it becomes possible to execute the access of the other cluster CL1 as indicated by P in FIG. 5.

Figure 6:
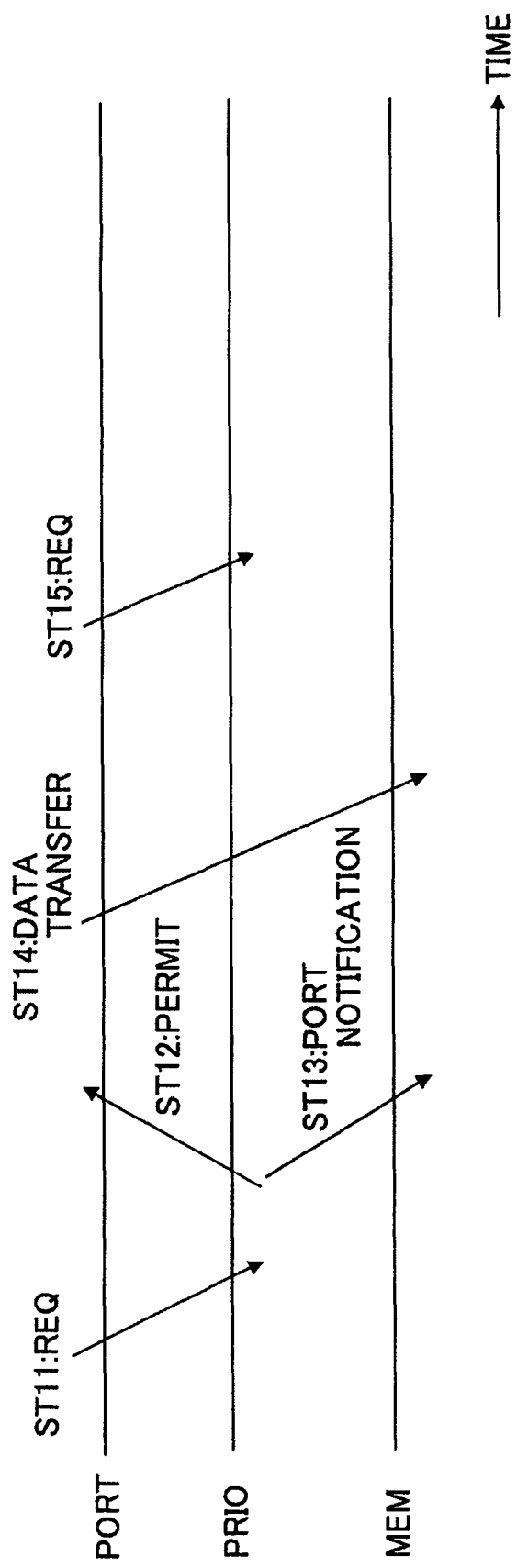
FIG. 6 is a diagram for explaining a store operation.

Next, a description will be given of the access process of the cluster, by referring to FIG. 6. FIG. 6 is a diagram for explaining a store operation. In FIG. 6, "PORT" indicates an arbitrary port, "PRIO" indicates the priority determination circuit 24, and "MEM" indicates the memory 25.

The port PORT which receives an access instruction from an arbitrary cluster CL segments the received access instruction into units of banks, and requests access to the priority determination circuit 24 for each segmented unit or bank, in a step ST11 (REQ). The priority determination circuit 24 confirms whether a contention (or conflict) of an access from another cluster CL exists, and carries out a contention process if the contention exists. The contention process determines the priority order of the access based on flags which are provided within the priority determination circuit 24 and average the accesses from each of the clusters CL. The priority determination circuit 24 carries out the above contention process and returns an access permit (or authorization) to the port PORT, in a step ST12 (PERMIT), and notifies the selected port PORT to the memory 24, in a step ST13 (PORT NOTIFICATION). If the access instruction is a store instruction, the port PORT which is given the access permit transfers data amounting only to the segmented unit (or block) to the memory 25, in a step ST14 (DATA TRANSFER). On the other hand, if the access instruction is a read instruction, the memory 25 transfers data amounting only to the segmented unit (or block) to the selected (or specified) port PORT. Thereafter, the port PORT repeats the access request with respect to the priority determination circuit 24 until the amount of data transferred from the arbitrary cluster CL reaches the selected (or specified) transfer length, in a step ST15 (REQ).

The contention among the clusters CL occurs in units of banks, and the priority determination circuit 24 manages the flags described above. For example, suppose that a contention occurs between the access ST1 from the cluster CL0 and the access P from the cluster CL1 for the bank BANK0 in FIG. 5. In this case, the priority determination circuit 24 varies the flags in order to update the priority order of the cluster CL0 to the lowest priority order, so that if the access ST1 of the cluster CL0 is executed the other cluster CL1 will be selected when the contention next occurs. In the case of the access ST1 in FIG. 5, the access of the cluster CL0 is executed first, while the access of the cluster CL1 is waited until the access of the cluster CL0 ends, and the access of the cluster CL1 is executed when permitted. If no contention exists, the priority determination circuit 24 executes the accesses of each of the clusters CL in the order in which the accesses are received.

Because the transfer length of the LOCK instruction is shorter than the bank length, the LOCK instruction is also managed in units of banks. The priority determination circuit 24 has the LOCK address register 241 in correspondence with each of the clusters CL0 through CLn, and the address of the LOCK instruction is held in the LOCK address register 241 during execution of the LOCK instruction. When selecting from the banks the access of the cluster CL that is to be executed, the priority determination circuit 24 checks whether an overlap exists between the address of the access that is to be executed and the address of the LOCK instruction. If the address of the access from the cluster CL overlaps the address of the LOCK instruction, the access of the blocks subsequent to the corresponding bank is held by the priority determination circuit 24 until execution of the target LOCK instruction ends, by not giving an access permit to the corresponding port PORT from the priority determination circuit 24.

Similarly to the LOCK address register 241 that is provided in the priority determination circuit 24 for each of the ports PORT0 through PORTn for the address of the LOCk instruction, the priority determination circuit 24 also has the start and end address register 242 which holds the start address and the end address of the instruction that is being executed, in units of ports.

When the BC instruction is executed, the start address and the end address of the access that is to be executed or is being executed by each cluster CL are compared with the start address and the end address of the BC instruction that is to be executed. In this case, the addresses that are compared are not the addresses segmented into units of banks within the SSU 2, but are the addresses of the entire instructions notified from the clusters CL. If the addresses of the instructions that are being executed (already executed even if 1 block) and the BC instruction that is to be executed, the execution of the BC instruction is waited until the execution of all the instructions that are being executed ends. In the waiting state of the BC instruction, the access from the other clusters CL that has an address overlapping the address of the BC instruction is waited until the waiting state of the BC instruction is released. On the other hand, even if 1 block of the BC instruction is executed, the access from the other cluster CL that has the address overlapping the address of the BC instruction is waited until the execution of the BC instruction ends.

The BC instruction must be distinguished from other instructions by hardware recognition. For this reason, the BC instruction must be clearly defined by software or firmware. In addition, the BC instruction needs to be distinguished from other extended instructions. Accordingly, it is desirable to allocate a new operand or a flag for the purposes of distinguishing or recognizing the BC instruction.

Figure 7:
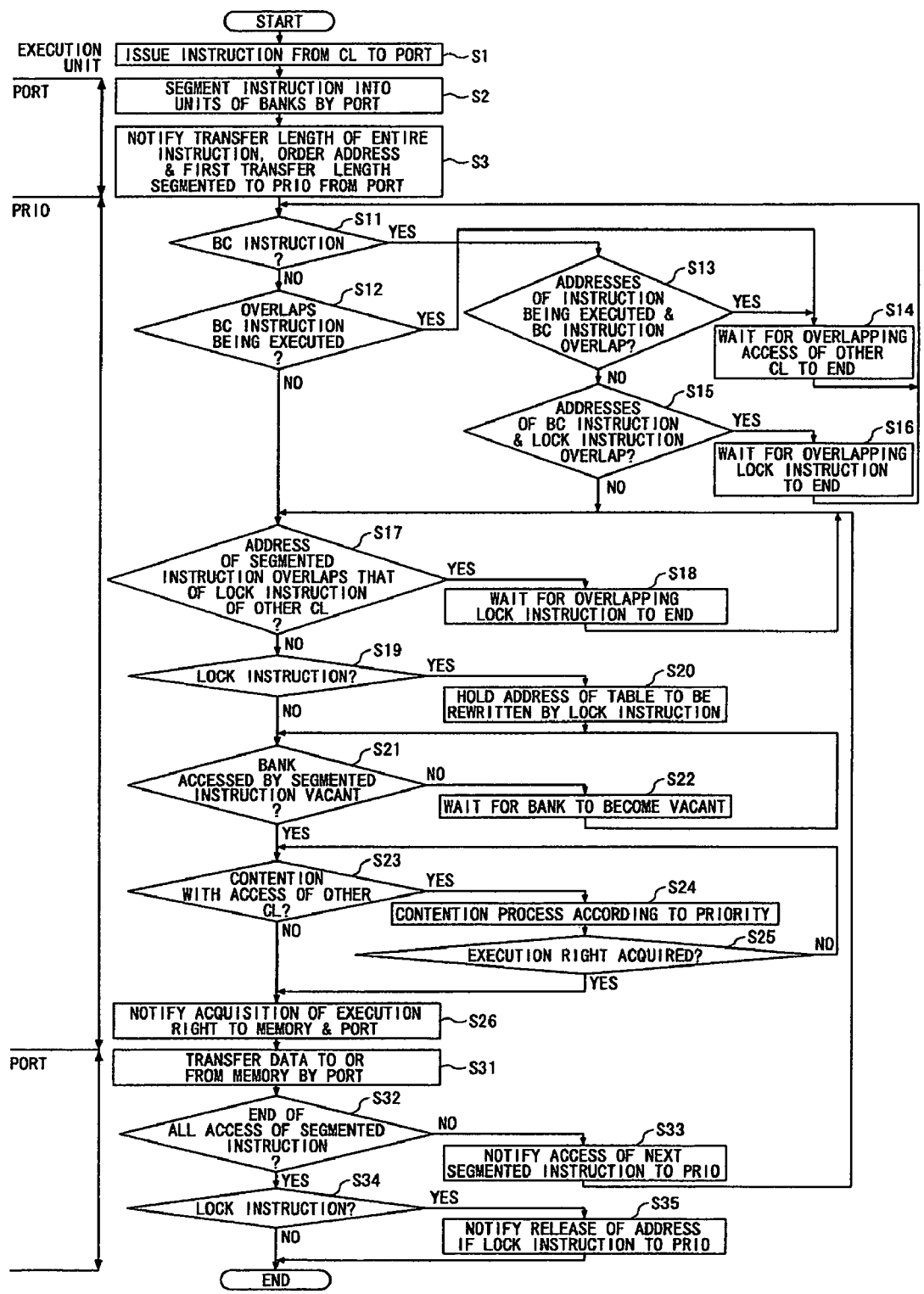
FIG. 7 is a flow chart for explaining an access control process in an embodiment of the present invention.

FIG. 7 is a flow chart for explaining an access control process in an embodiment of the present invention. In FIG. 7, a step S1 performs a process of an arbitrary cluster CL, steps S2, S3 and S31 through S35 perform a process by an arbitrary port PORT, and steps S11 through S26 perform a process of the priority determination circuit 24. Whether the instruction from the cluster CL is the BC instruction is defined by software, for example, and the priority determination circuit 24 can recognize the BC instruction according to this software definition and distinguish the BC instruction from other instructions.

In FIG. 7, the cluster CL issues an access instruction to the port PORT in the step S1.

In the port PORT, the step S2 segments the access instruction into units of banks. In addition, the step S3 notifies the transfer length of the entire access instruction, the access address (order address), the first transfer length that is segmented, and the like to the priority determination circuit 24.

In the priority determination circuit 24, the step S11 decides whether the notified instruction is the BC instruction. If the decision result in the step S11 is NO, the step S12 decides whether the notified instruction accesses an address that overlaps the address of the BC instruction that is being executed. If the decision result in the step S11 is YES, the step S13 decides whether the address of the instruction that is being executed overlaps the address of the BC instruction. If the decision result in the step S13 is YES, the step S14 waits for the different access of the other cluster to end, and the process returns to the step S11. The step S14 is also performed if the decision result in the step S12 is YES. If the decision result in the step S13 is NO, the step S15 decides whether the address of the BC instruction overlaps the address of the LOCK instruction. If the decision result in the step S15 is YES, the step S16 waits for the LOCK instruction having the overlapping address to end, and the process returns to the step S11. If the decision result in the step S12 or the step S15 is NO, the process advances to the step S17.

The step S17 decides whether the address of the segmented instruction overlaps the address of the LOCK instruction of the other cluster CL. If the decision result in the step S17 is YES, the step S18 waits for the LOCK instruction having the overlapping address to end, and the process returns to the step S17. If the decision result in the step S17 is NO, the step S19 decides whether the notified instruction is the LOCK instruction. If the decision result in the step S19 is YES, the step S20 holds the address of the table that is to be rewritten by the LOCK instruction, and the process returns to the step S17.

If the decision result in the step S19 is NO, the step S21 decides whether the bank to be accessed by the segmented instruction is vacant. If the decision result in the step S21 is NO, the step S22 waits for the bank that is to be accessed by the segmented instruction to become vacant, and the process returns to the step S21. If the decision result in the step S21 is YES, the step S23 decides whether a contention occurs between the access of the segmented instruction and the access of another cluster CL. If the decision result in the step S23 is YES, the step S24 performs the contention process which determines the priority order of the access based on the flags which are provided within the priority determination circuit 24 and average the accesses from each of the clusters CL, depending on the priority, and the process advances to the step S25. The step S25 decides whether the segmented instruction acquired the right to execute (or execution right) by the contention process, and the process returns to the step S23 if the decision result in the step S25 is NO. If the decision result in the step S23 is NO or, if the decision result in the step S25 is YES, the step S26 notifies the port PORT that the segmented instruction has acquired the right to execute, and the process advances to the step S31.

In the port PORT, the step S31 transfers the data from the cluster CL to the memory 25 in the case of the store instruction, and transfers the data from the memory 25 to the cluster CL in the case of the read instruction. The step S32 decides whether all access of the segmented instruction has ended. If the decision result in the step S32 is NO, the step S33 notifies the access of the next segmented instruction to the priority determination circuit 24, and the process returns to the step S17. If the decision result in the step S32 is YES, the step S34 decides whether the segmented instruction is the LOCK instruction. If the decision result in the step S34 is YES, the step S35 notifies the release of the address of the LOCK instruction to the priority determination circuit 24. If the decision result in the step S34 is NO or, after the step S35, the process ends.

Figure 8:
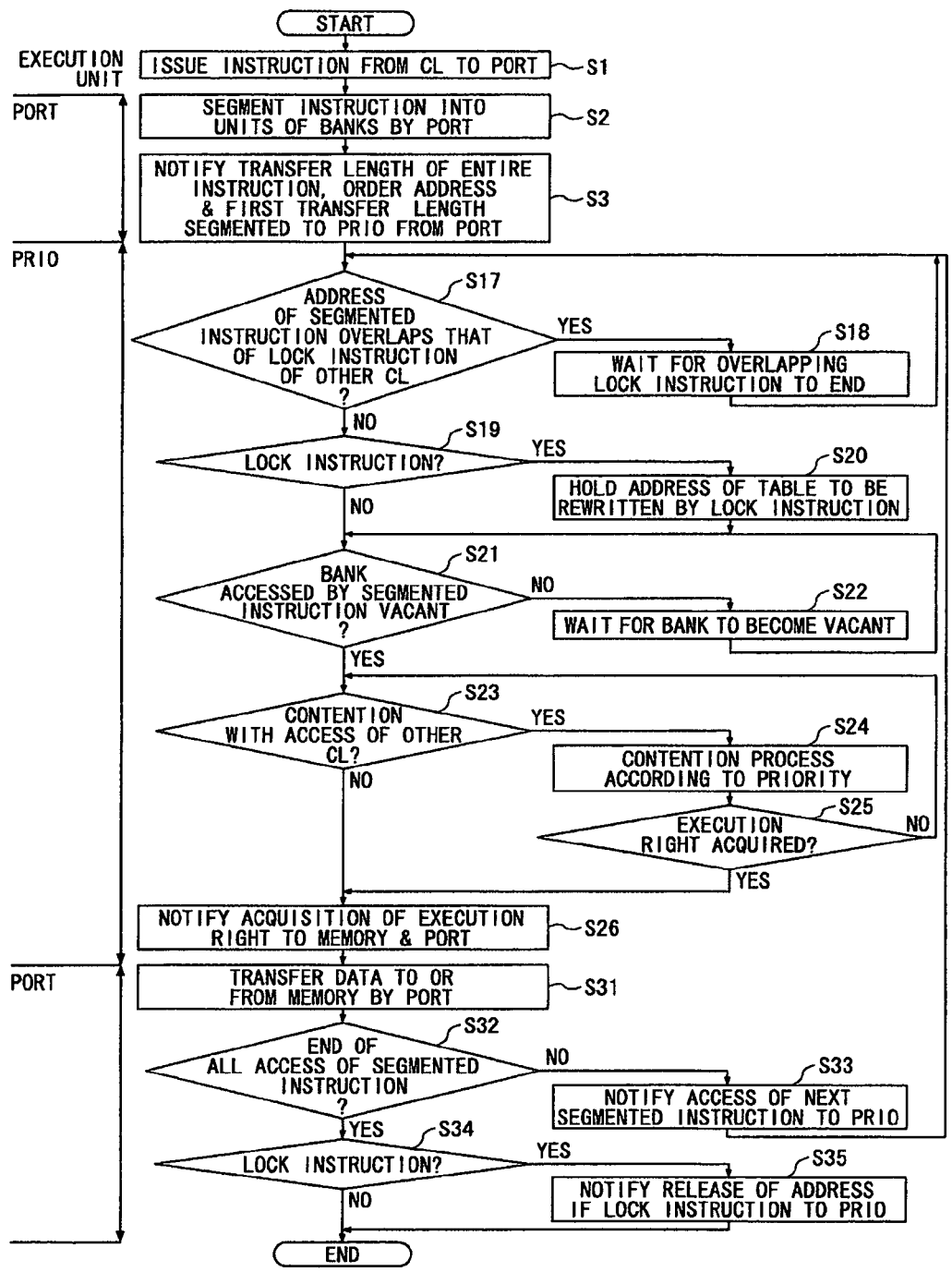
FIG. 8 is a flow chart for explaining an access control process in a comparison example.

FIG. 8 is a flow chart for explaining an access control process in a comparison example. In FIG. 8, those steps that are the same as those corresponding steps in FIG. 7 are designated by the same reference numerals, and a description thereof will be omitted. Unlike the embodiment described above which uses the BC instruction, this comparison example does not use the BC instruction.

For example, suppose that the data stored in the SSU 2 by the cluster CL0 is to be used by the other cluster CL1. In the case of the comparison example, the cluster CL1 refers to the table within the SSU 2 and confirms that the cluster CL0 is not accessing the access region before reading the data from the access region. If the access region is read directly by the cluster CL1 without referring to the table, the store and read will be executed simultaneously, and it would become impossible to judge whether the data read by the cluster CL1 is the data that is being updated by the cluster CL0. For this reason, in the case of the comparison example, because it is difficult to speed up the procedure in which the cluster CL1 confirms the end of updating the access region by the cluster CL0, it is difficult to increase the operation speed of a computer system in which a plurality of clusters share a storage unit.

On the other hand, in the case of the embodiment described above, the cluster CL0 issues the BC instruction. Hence, even if the access region is read directly by the cluster CL without referring to the table, the data read by the cluster CL1 are all data which have been updated or, are all data before the updating, and it is guaranteed that the data read by the cluster CL1 are not the data that are being updated by the cluster CL0, for example.

As may be seen by comparing the embodiment of FIG. 7 and the comparison example of FIG. 8, the embodiment simply adds the steps S11 through S16 illustrated in FIG. 7. In the case where a plurality of clusters share a storage unit, the embodiment predefines and adds an access instruction with exclusive right to the access instruction to the shared storage unit, so that the transfer access to the shared storage unit and the access instruction with exclusive right can be executed with exclusion. As a result, it is possible to speed up the procedure in which one cluster confirms the end of updating an access region by another cluster, and it is possible to increase the operation speed of a computer system in which a plurality of clusters share the storage unit.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An access control method for a computer system in which a plurality of clusters share a storage unit, comprising:
    predefining an access instruction with exclusive right in addition to an access instruction that is issued with respect to the storage unit from the plurality of clusters;
    storing, in a register within the storage unit, a table rewrite instruction that is transferred from at least one of the plurality of clusters and instructs rewriting of the table; and
    determining, in the storage unit, a priority order of an access instruction transferred from an arbitrary cluster and an access instruction transferred from another cluster,
    wherein the determining waits for the access instruction transferred from the other cluster to end when the access instruction transferred from the arbitrary cluster is an access instruction with exclusive right and accesses an address that overlaps an address of an access instruction that is being executed, and
    wherein the determining waits for execution of the table rewrite instruction stored in the register to end when the access instruction transferred from the arbitrary cluster is an access instruction with exclusive right and accesses an address that does not overlap an address of an access instruction that is being executed but overlaps an address of the table rewrite instruction.

2. The access control method as claimed in claim 1, further comprising:
    judging, in the storage unit, acquisition of a right to execute the access instruction transferred from the other cluster without referring to the table, when an access region accessed by the address of the access instruction transferred from the other cluster does not overlap an access region accessed by the address of the access instruction with exclusive right transferred from the arbitrary cluster.

3. The access control method as claimed in claim 2, further comprising:
    judging, in the storage unit, acquisition of the right to execute the access instruction transferred from the other cluster without referring to the table, when an access region accessed by the address of the access instruction transferred from the other cluster does not overlap an access region accessed by an address of a table rewrite instruction that is transferred from the arbitrary cluster and instructs rewriting of the table.

4. A computer system comprising:
    a plurality of clusters; and
    a storage unit shared by the plurality of clusters,
    wherein an access instruction with exclusive right is predefined in addition to an access instruction that is issued with respect to the storage unit from the plurality of clusters,
    wherein the storage unit includes a register configured to store a table rewrite instruction that is transferred from at least one of the plurality of clusters and instructs rewriting of the table, and a priority determination circuit configured to determine a priority order of an access instruction transferred from an arbitrary cluster and an access instruction transferred from another cluster,
    wherein the priority determination circuit waits for the access instruction transferred from the other cluster to end when the access instruction transferred from the arbitrary cluster is an access instruction with exclusive right and accesses an address that overlaps an address of an access instruction that is being executed, and
    wherein the priority determination circuit waits for execution of the table rewrite instruction stored in the register to end when the access instruction transferred from the arbitrary cluster is an access instruction with exclusive right and accesses an address that does not overlap an address of an access instruction that is being executed but overlaps an address of the table rewrite instruction.

5. The computer system as claimed in claim 4,
    wherein the priority determination circuit judges acquisition of a right to execute the access instruction transferred from the other cluster without referring to the table, when an access region accessed by the address of the access instruction transferred from the other cluster does not overlap an access region accessed by the address of the access instruction with exclusive right transferred from the arbitrary cluster.

6. The computer system as claimed in claim 5,
    wherein the storage unit includes a plurality of ports coupling to the plurality of clusters, and
    wherein the priority determination circuit notifies the acquisition of the right to execute the access instruction transferred from the other cluster to one of the plurality of ports corresponding to the other cluster.

7. The computer system as claimed in claim 6, wherein the priority determination circuit judges the acquisition of the right to execute the access instruction transferred from the other cluster without referring to the table, when an access region accessed by the address of the access instruction transferred from the other cluster does not overlap an access region accessed by an address of a table rewrite instruction that is transferred from the arbitrary cluster and instructs rewriting of the table.

8. The computer system as claimed in claim 5, wherein the priority determination circuit judges the acquisition of the right to execute the access instruction transferred from the other cluster without referring to the table, when an access region accessed by the address of the access instruction transferred from the other cluster does not overlap an access region accessed by an address of a table rewrite instruction that is transferred from the arbitrary cluster and instructs rewriting of the table.

9. The access control method as claimed in claim 1, wherein the determining waits for the access instruction transferred from the other cluster to end when the access instruction transferred from the arbitrary cluster is not an access instruction with exclusive right and accesses an address that overlaps an address of an access instruction with exclusive right that is being executed.

10. The computer system as claimed in claim 4, wherein the priority determination circuit waits for the access instruction transferred from the other cluster to end when the access instruction transferred from the arbitrary cluster is not an access instruction with exclusive right and accesses an address that overlaps an address of an access instruction with exclusive right that is being executed.

* * * * *